TEMPERATURE COMPENSATION FOR DATA STORAGE DEVICE

Filed Sept. 30, 1968

INVENTORS
MARTIN O. HALFHILL
CHARLES R. WILFORD
BY Robert B. Crouch
ATTORNEY

United States Patent Office 3,531,789

Patented Sept. 29, 1970

3,531,789

TEMPERATURE COMPENSATION FOR DATA STORAGE DEVICE

Martin O. Halfhill and Charles R. Wilford, San Jose, Calif., assignors to Information Storage Systems, Inc., San Jose, Calif., a corporation of California Filed Sept. 30, 1968, Ser. No. 763,596
Int. Cl. G11b *5/56, 21/02*
U.S. Cl. 340—174.1 6 Claims

ABSTRACT OF THE DISCLOSURE

In magnetic disk recording devices, apparatus for reducing radial tolerances attributable to head-to-disk temperature variations, including a detector for producing an output proportional to the head-to-disk temperature differential, and circuitry for converting the output to an offset signal with a predetermined decay characteristic for correction of the head position relative to the disk.

BACKGROUND

In direct access data storage devices of the type that employ a pack of removable recording disks, the radial tolerances due to temperature variations between the read/write heads and the disk surfaces become severe. When the disk pack is attached to a drive, it is usually at room temperature, whereas the drive, except when it has just been turned on, is usually at its operating temperature which is 10° to 20° warmer. Data is recorded on a disk surface in concentric tracks at densities of up to 100 tracks per inch, therefore, the problem of achieving registration between the read/write head and any given track is acute and is complicated by any temperature differential between the head and the disk. The recording disks expand and contract radially with temperature variations, thereby shifting the individual track locations relative to the head. Due to the very fine spacing between tracks, there is a very limited amount of relative shifting that can occur between the head and the disk before the heads begin to pick up interference from data recorded in the adjacent tracks. Therefore, a range of temperatures must be established over which the device will operate effectively since the expansion and contraction of the disk is proportional to the change in temperature.

The problem presented by temperature variations has heretofore been approached from the stand-point of heating either the read/write heads or the recording medium to bring the two within a desired temperature range. In some cases this has involved mounting heating coils adjacent either the read/write heads or the recording medium, while in other cases a delay period is set into the operating cycle of the device to allow the recording surfaces and the read/write heads to warm up and reduce the temperature differential to a value that is within the operating temperature range of the device. Neither approach has been satisfactory since they have involved either a delay in the operation of the device or extensive complications of the mechanical features of the device.

INVENTION

The present invention avoids the shortcomings of the prior known direct access data storage devices by provision of compensation for head-to-disk temperature differential as it exists in the device without delay for warm up. This is accomplished by measurement of the head-to-disk temperature differential and then generation of an offset signal for displacement of the head relative to the disk. In this invention a first signal is generated which is proportional to the difference in temperature between the device operating environment and the room ambient temperature. Means is provided for converting the first signal into an offset signal which diminishes with a time constant equal to that of the pack-to-machine equilibrium and for then applying the offset signal to a read/write head positioning mechanism.

The foregoing and other objects, features and advantages of the invention will be apparent from the following more particular description of a preferred embodiment of the invention as illustrated in the accompanying drawings wherein.

Figure 1:
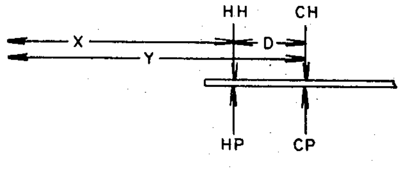
FIG. 1 is a diagrammatic view illustrating the effects of temperature differential between a read/write head and a disk surface.

Referring to FIG. 1 of the drawing, a read/write head is assumed to be either hot (HH) or cold (CH), likewise the disk pack is either hot (HP) or cold (CP). Assuming the read/write head is some distance from a fixed part of the disk drive, for instance, an edge of the base plate, which is X for hot head and Y for a cold head, the difference between X and Y equals D. Assuming the head is either at the HH or CH position and a given track on the disk 11 is at either the HP or CP position, the track can either be at the left (positive) or at the right (negative) of the head. Therefore, the total tolerance of the system must be 2D to accommodate both conditions. By introduction of an offset signal to the head positioning system in the case of the hot head condition, so as to always locate the head in the CH position, the tolerance requirement can be reduced to D as follows:

| | Correction | Tolerance |
|---|---|---|
| Condition: | | |
| (a) CH-HP | No | +D |
| (b) CH-CP | No | 0 |
| (c) HH-HP | Yes | +D |
| (d) HH-CP | Yes | 0 |

Compensation for the temperature-induced radial displacement can be carried out by first measuring the differential between the room ambient temperature and the head environment temperature; then generating an offset signal which is proportional to the temperature differential and which decreases with a time constant equal to the disk pack-to-machine equilibrium time constant, i.e., the time rate of change required for the pack to reach an equilibrium condition with the drive; and finally interjecting the offset signal into the head positioning mechanism to move the head an amount which corresponds with the offset signal. In the HH condition the amount of correction introduced into the system is directly proportional to the temperature differential and will vary with the situation. However, the rate of decrease or decay of the correction will remain the same for every case.

Figure 2:
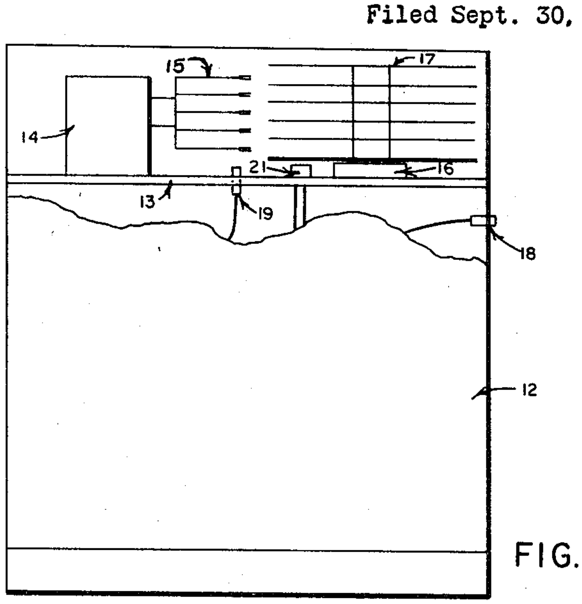
FIG. 2 is an elevation view, partly in section, of a direct access storage device with the temperature compensation of the present invention mounted therein.

FIG. 2 shows a disk drive which includes an external sheet metal enclosure 12, a base plate 13 mounted within the enclosure and supporting an actuator mechanism 14. A number of read/write heads are mounted on the distal ends of an array of cantilevered arms 15 which are carried by the actuator. A motor driven spindle 16 is mounted in the base plate at a point spaced from the actuator and is adapted to receive a removable pack of disks 17. A pair of temperature sensing devices, such as thermistors 18 and 19 are mounted in the drive, thermistor 18 being mounted to protrude through the enclosure 12 to the exterior of the device and thermistor 19 being mounted in the base plate 13 to protrude from the upper surface thereof into proximity with the read/write heads. A pressure sensitive switch 21 is supported on the upper surface of the base plate adjacent to the spindle.

Figure 3:
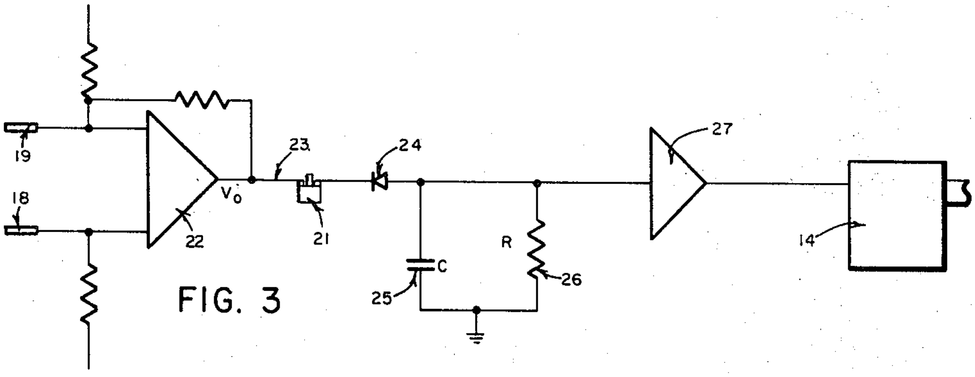
FIG. 3 is a schematic view of a preferred embodiment of the circuitry of the present invention.

Referring to FIG. 3 of the drawing, the circuitry of the present invention is illustrated in schematic form. As shown, the outputs from the thermistors 18 and 19 are connected to the input of an operational amplifier 22. The switch 21 is connected in a line 23 extending from the output of the amplifier through a diode 24 to an RC network which has a time constant of 100 sec. and which consists of a 10 mfd. capacitor 25 and a 10 megohm resistor 26. The RC network is connected to the input of a voltage follower 27, which buffers the RC network from the power source of the actuator 14. In an alternative form of the invention shown in FIG. 4 the RC network is connected through a diode 28 to a sample and hold network 29 which is in turn connected to the actuator. A pulse generator 31 is connected to the sample and hold network as shown.

In the operation of the present invention thermistor 18 measures the ambient temperature of the room in which the disk packs are stored when removed from the disk drive. Thermistor 19 measures the temperature of the operating environment of the read/write heads. The operational amplifier 22 combines the inputs from thermistors 18 and 19 and provides an output which is proportional to the difference in the temperatures sensed by the two thermistors. Switch 21 is illustrative of any device for breaking the connection between the amplifier 22 and the RC network whenever a disk pack is in place on the spindle. When the disk pack is taken off the spindle, the switch makes the connection and the RC network is charged to $V_o$ which is the level of the output of the operational amplifier. When another pack is placed on the spindle, the switch is opened and the capacitor 25 is allowed to discharge through resistor 26 to the voltage follower 27. The voltage follower is an operational amplifier with a gain of one and draws little or no current. The input impedance of the voltage follower is very high, on the order of 10,000 megohms and is so much larger than the value of resistor 26 that the effective resistance in the RC network is resistor 26. The values of capacitor 25 and resistor 26 are chosen so that the capacitor is allowed to discharge exponentially at a time rate of change which equals the rate of thermal expansion of the disk pack. The voltage follower 27 follows the output of the RC network directly and transmits a correspondingly varying current signal to the head positioning actuator to offset the read/write heads an amount which corresponds to the initial temperature differential and which decreases exponentially with the discharge of the capacitor.

Figure 4:
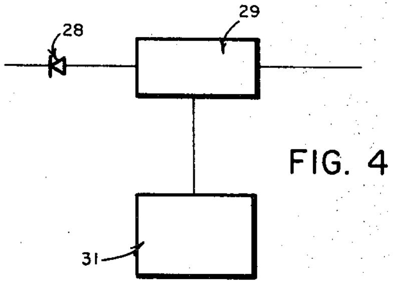
FIG. 4 is a schematic view of an alternative form of the circuitry of the present invention.
Figure 5:
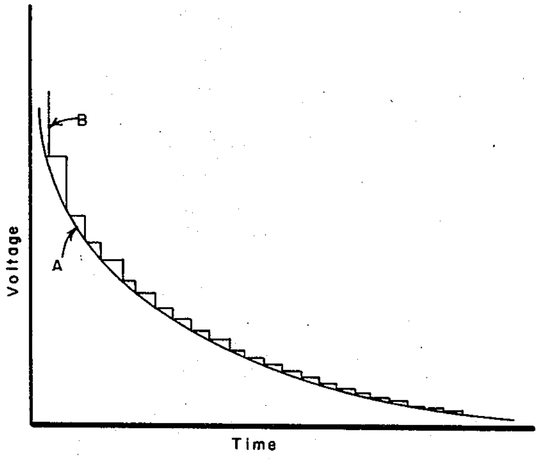
FIG. 5 is a chart of curves traced by the circuitry of FIGS. 3 and 4 respectively.

In the circuitry of FIG. 4 the RC network of FIG. 3 discharges through a diode 28 to the sample and hold network 29. The pulse generator 31 generates a one millisecond pulse at one half second frequency to sample the RC network. The sample and hold network provides an output current which equals the voltage across the RC network at the time it is sampled. The effect of this circuitry approximates that of FIG. 3 except that the input current to the actuator 14 follows curve B of FIG. 5 instead of the smooth exponential curve A as does the circuitry of FIG. 3.

The present invention effectively doubles the operating temperature range of a direct access data storage device since it reduces the temperature tolerance by one half. At the same time, it avoids the necessity of the delay period presently employed in such devices.

While the invention has been particularly shown and described with reference to a preferred embodiment thereof, it will be understood by those skilled in the art that various changes and modifications may be made without departing from the spirit and scope of the invention.

We claim:

1. In a data storage device of the type that employs moveable read/write heads with a replaceable pack of magnetic recording disks, apparatus for reducing radial tolerances due to head-to-disk temperature variations, including:

first means for determining the temperature differential between the head operating environment in the device and the pack storage environment external of the device;

second means for developing an offset signal from the temperature differential for adjusting position of the heads said offset signal decreasing with the same rate of change as the pack.

2. Apparatus as defined in claim 1 which includes:

third means for initiating an offset signal each time the pack is removed from the device.

3. Apparatus as defined in claim 2 wherein:

the second means includes means for developing an offset signal which is proportional to the temperature differential.

4. Apparatus as defined in claim 2 wherein:

the second means includes circuitry for developing an offset signal having an initial value proportional to the temperature differential and which decays with a time constant equal to that of the pack-to-machine equilibrium time constant.

5. Apparatus as defined in claim 4 wherein:

the second means includes an RC network and the third means includes means for charging the RC network whenever a pack is removed and discharging the network each time a pack is mounted on the device.

6. Apparatus as defined in claim 5 wherein:

the first means includes a first temperature sensing device mounted near the heads, a second temperature sensing device mounted on the exterior of the storage device, and amplifier means for taking the difference between the outputs of the two temperature sensing devices and providing a signal proportional thereto.

References Cited

UNITED STATES PATENTS

| | | | |
|---|---|---|---|
| 3,270,328 | 8/1966 | McCreary | 179—100.2 |
| 3,263,031 | 7/1966 | Welsh | 340—174.1 |
| 3,449,735 | 6/1969 | Cogar | 340—174.1 |

STANLEY M. URYNOWICZ, Jr., Primary Examiner

V. P. CANNEY, Assistant Examiner

U.S. Cl. X.R.

274—41.4